United States Patent
Cunningham et al.

(10) Patent No.: US 7,590,762 B2
(45) Date of Patent: Sep. 15, 2009

(54) API FOR NETWORK DISCOVERY

(75) Inventors: Aaron Cunningham, Redmond, WA (US); Alok Sinha, Redmond, WA (US); Bill Begorre, Redmond, WA (US); David G. Thaler, Redmond, WA (US); David Jones, Seattle, WA (US); Marieke I. Watson, Seattle, WA (US); Patrice L. Miner, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 556 days.

(21) Appl. No.: 11/296,790

(22) Filed: Dec. 7, 2005

(65) Prior Publication Data
US 2007/0130429 A1     Jun. 7, 2007

(51) Int. Cl.
G06F 15/16     (2006.01)
(52) U.S. Cl. ............... 709/250; 719/315; 719/319; 709/223; 709/220
(58) Field of Classification Search ........... 709/223, 709/220, 250; 711/147; 719/315, 319
See application file for complete search history.

(56) References Cited

U.S. PATENT DOCUMENTS

| | | | |
|---|---|---|---|
| 6,314,476 B1 | 11/2001 | Ohara et al. | |
| 6,336,152 B1 | 1/2002 | Richman et al. | |
| 6,493,751 B1* | 12/2002 | Tate et al. | 709/221 |
| 6,611,501 B1 | 8/2003 | Owen et al. | |
| 2001/0053694 A1 | 12/2001 | Igarashi et al. | |
| 2002/0007407 A1* | 1/2002 | Klein | 709/225 |
| 2002/0040389 A1* | 4/2002 | Gerba et al. | 709/219 |
| 2003/0055957 A1 | 3/2003 | Clark et al. | |
| 2003/0200287 A1* | 10/2003 | Vasamsetti et al. | 709/220 |
| 2004/0210649 A1 | 10/2004 | Bhogal et al. | |
| 2004/0230666 A1 | 11/2004 | Taboada et al. | |
| 2005/0091357 A1 | 4/2005 | Krantz et al. | |
| 2005/0125511 A1* | 6/2005 | Hunt | 709/220 |
| 2005/0135315 A1 | 6/2005 | Sinha | |

FOREIGN PATENT DOCUMENTS

| | | |
|---|---|---|
| WO | WO-9949643 | 9/1999 |
| WO | WO-0078001 | 12/2000 |

OTHER PUBLICATIONS

Held et al., "Modeling of Context Information for Pervasive Computing Applications," http://wwwrn.inf.tu-dresden.de/~buchholz/hades/SCI2002-paper512JH.pdf.
Bakry et al., "Identifying Information Network Profiles for Planning Management," John Wiley & Sons, Inc. 1999-2005, http://www3.interscience.wiley.com/cgi-bin/abstract/75001102/ABSTRACT.

* cited by examiner

*Primary Examiner*—Salad Abdullahi
*Assistant Examiner*—Anthony Mejia
(74) *Attorney, Agent, or Firm*—Marshall, Gerstein & Borun LLP

(57) ABSTRACT

Discovery of a network to which a device is in communication and classifying the network is disclosed. The network may be classified as a network already known or a new network signature may be created where the network signature is made up of a network id, a link id and a hop id.

12 Claims, 6 Drawing Sheets

API FOR NETWORK DISCOVERY

BACKGROUND

Historically, operating systems have communicated network status and associated system settings with the network adapters in the computer. For example, the system would report that "Local Area Connection 1" or "Wireless Connection 1" is connected, and firewall settings could be set per-adapter. Network adapter types are a complicated concept and require users to understand networking concepts in order to understand status. In addition, as the number of network adapter types increases, it becomes increasingly likely that a computer will connect to the same network over multiple adapters. Moreover, a network adapter is likely to be used to connect to multiple networks, and system settings that are appropriate from one network may not be correct for another network. Typical users care about what they are connected to, not how they are connected, and many system settings should be based upon the network to which the computer is connected, not how they are connected.

SUMMARY

Discovery of a network to which a device is in communication and classifying the network is disclosed. The network may be classified as a network already known or a new network signature may be created where the network signature is made up of a network id, a link id and a hop id. The discovery may use APIs created to assist the network discovery process. User interfaces to assist users with network connections also are described.

DRAWINGS

Figure 3:
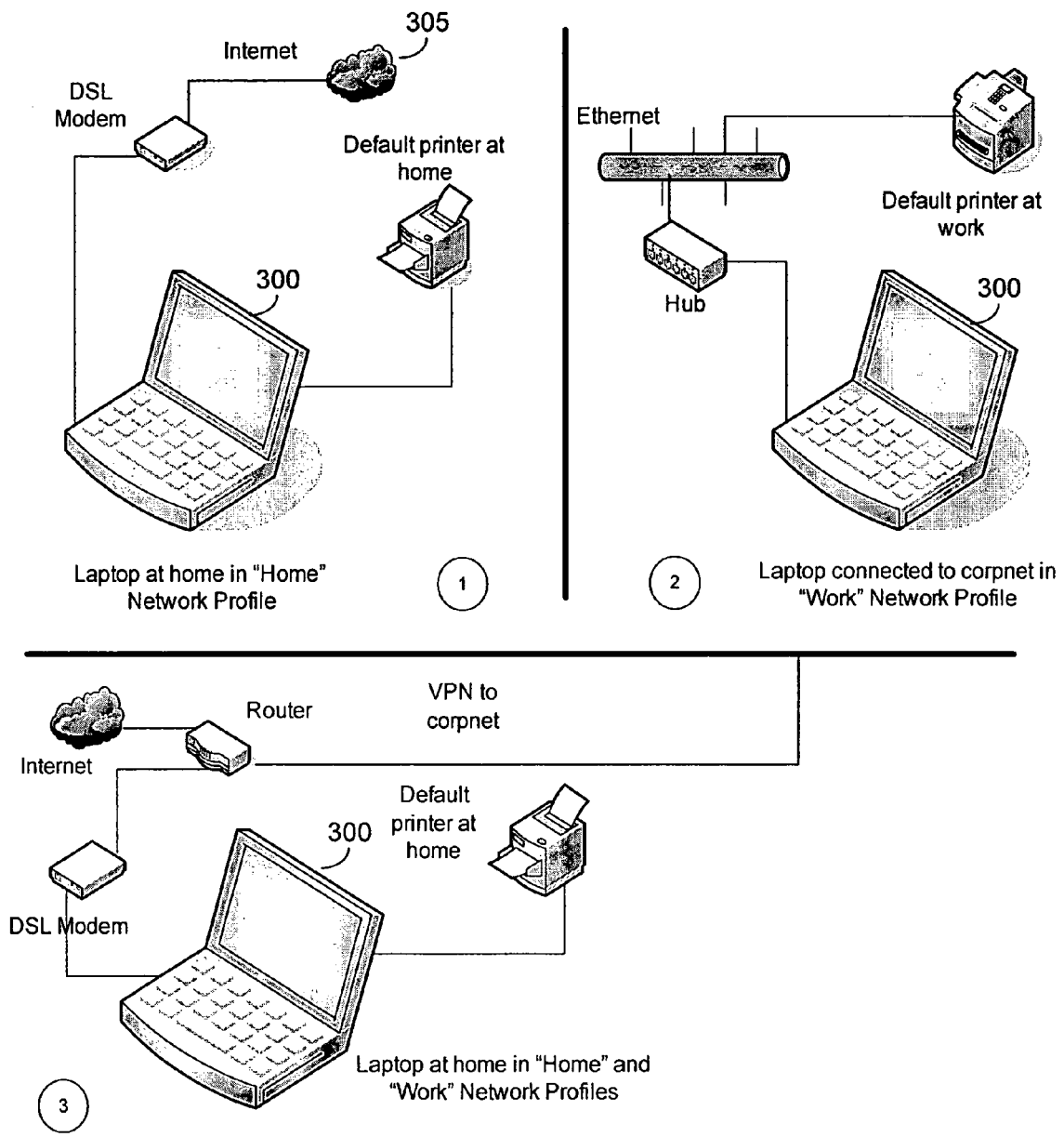
Figure 4:
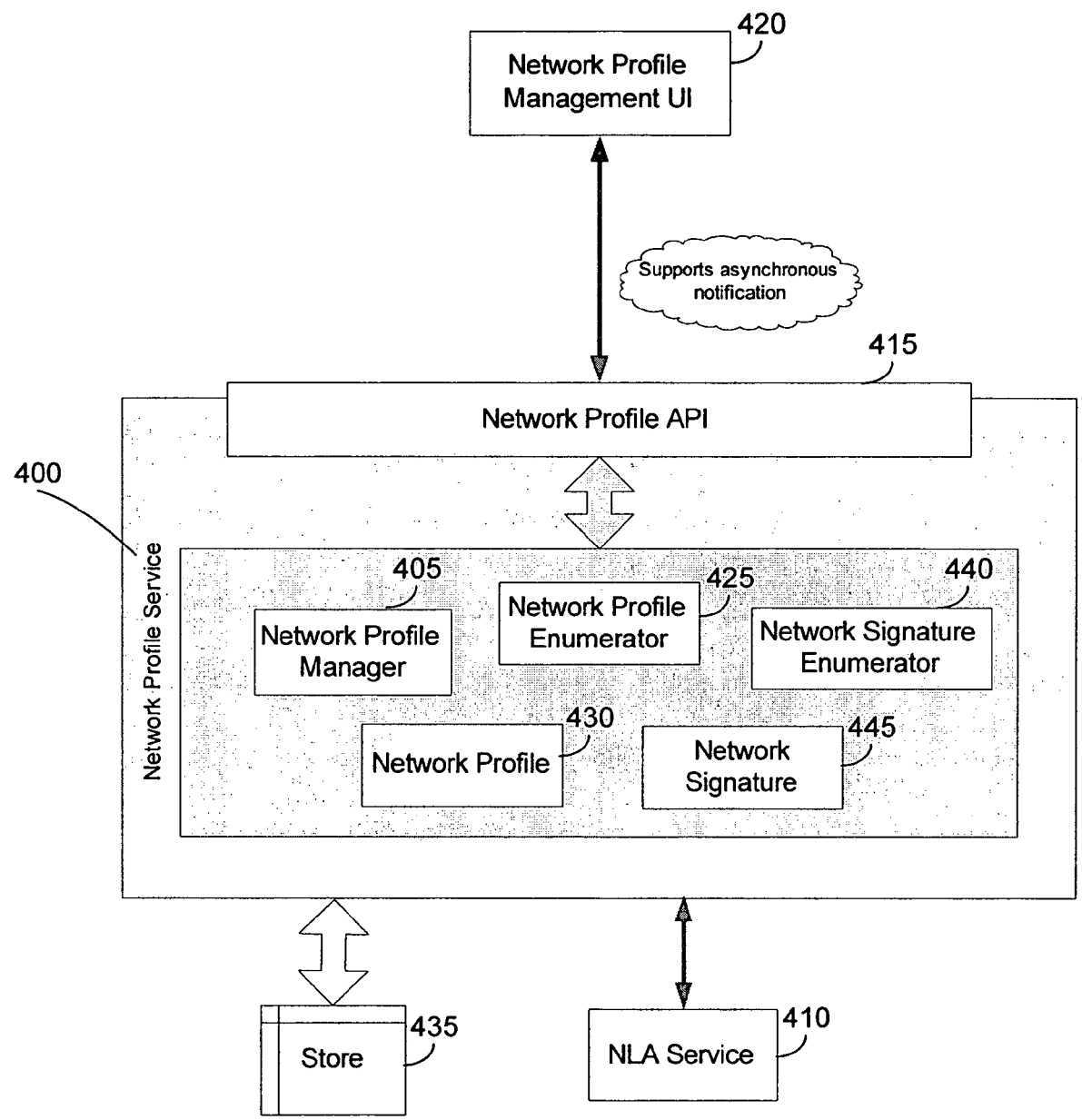
Figure 5:
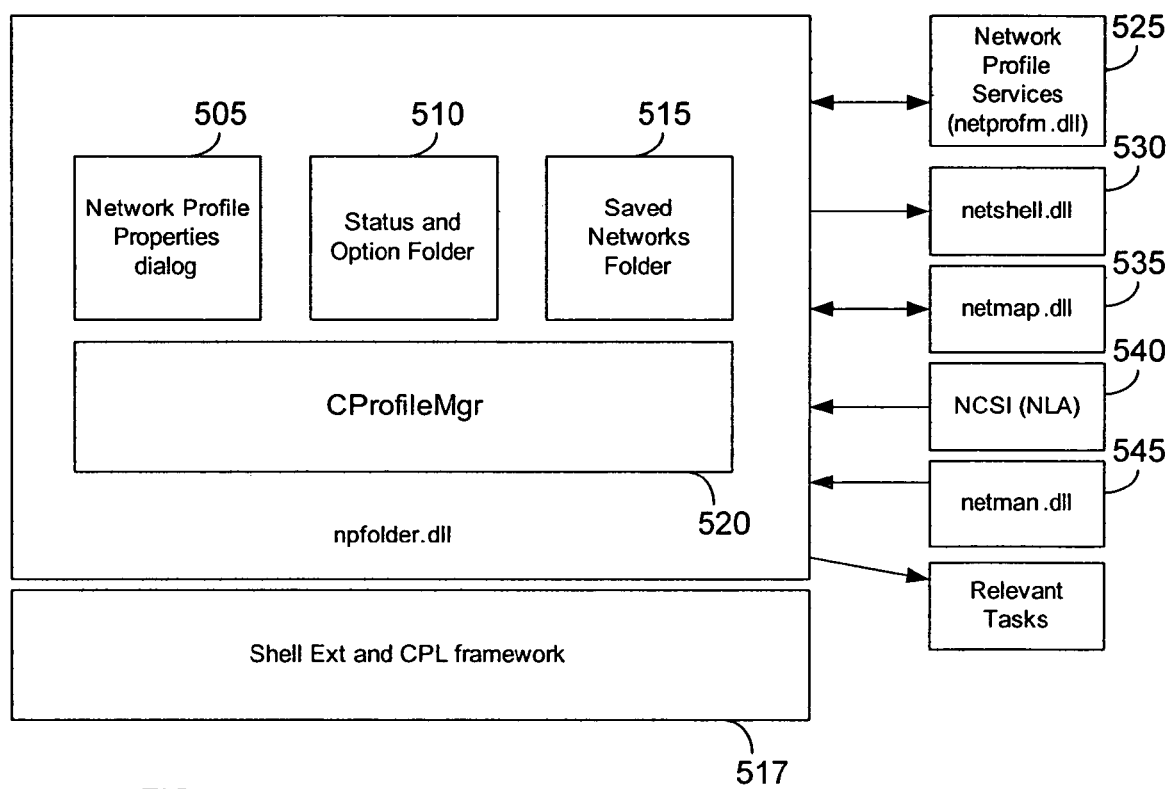
Figure 6:
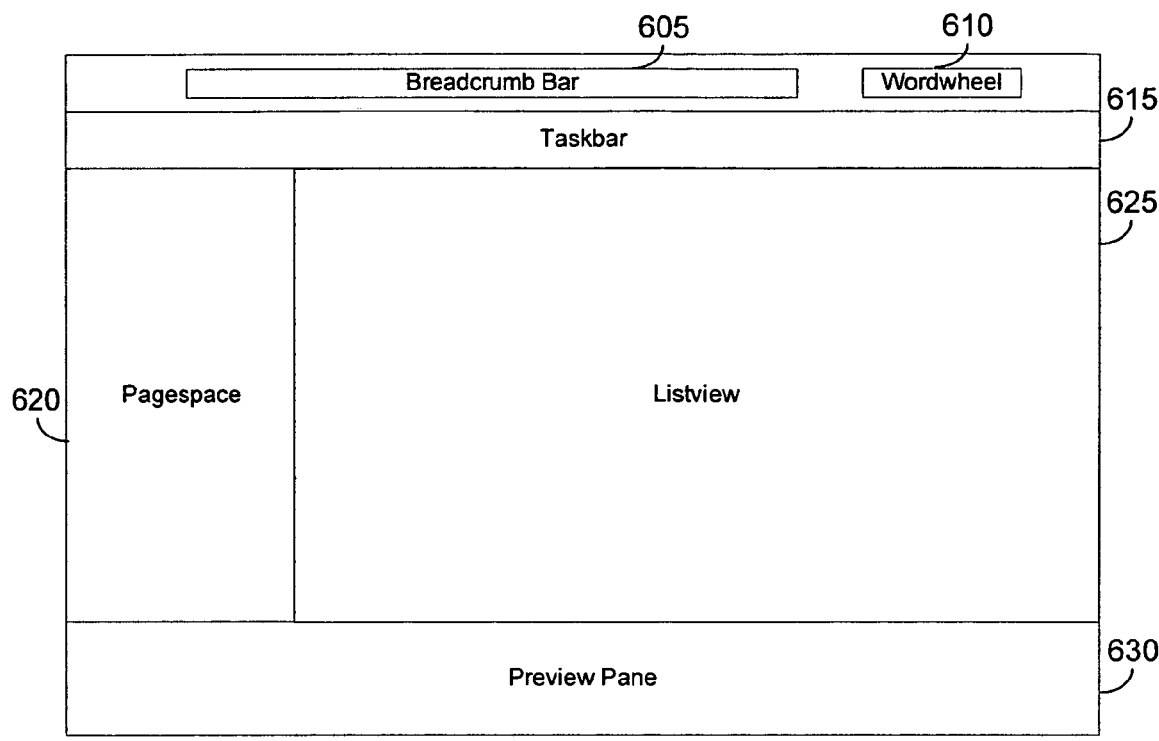
Figure 7:
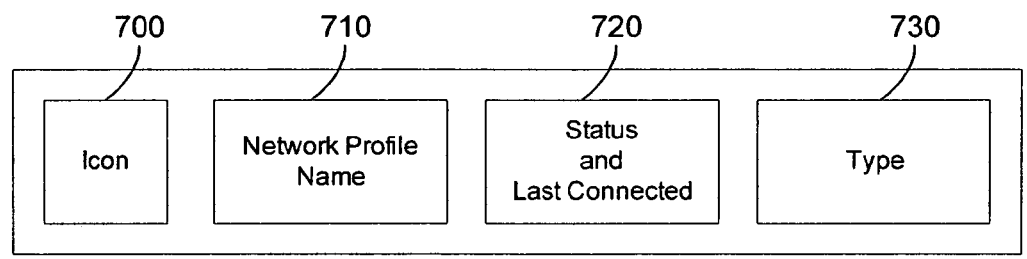

FIG. 3 may be an illustration of some examples of network profiles that are created when laptop connects to home or office network;

FIG. 4 may be an illustration of a programmatic view of one manner of executing the method;

FIG. 5 may be an illustration of the architecture for the method;

FIG. 6 may be an illustration of a sample Network Connection Folder in accordance with the method; and FIG. 7 may be an illustration of a grouping of network icons.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
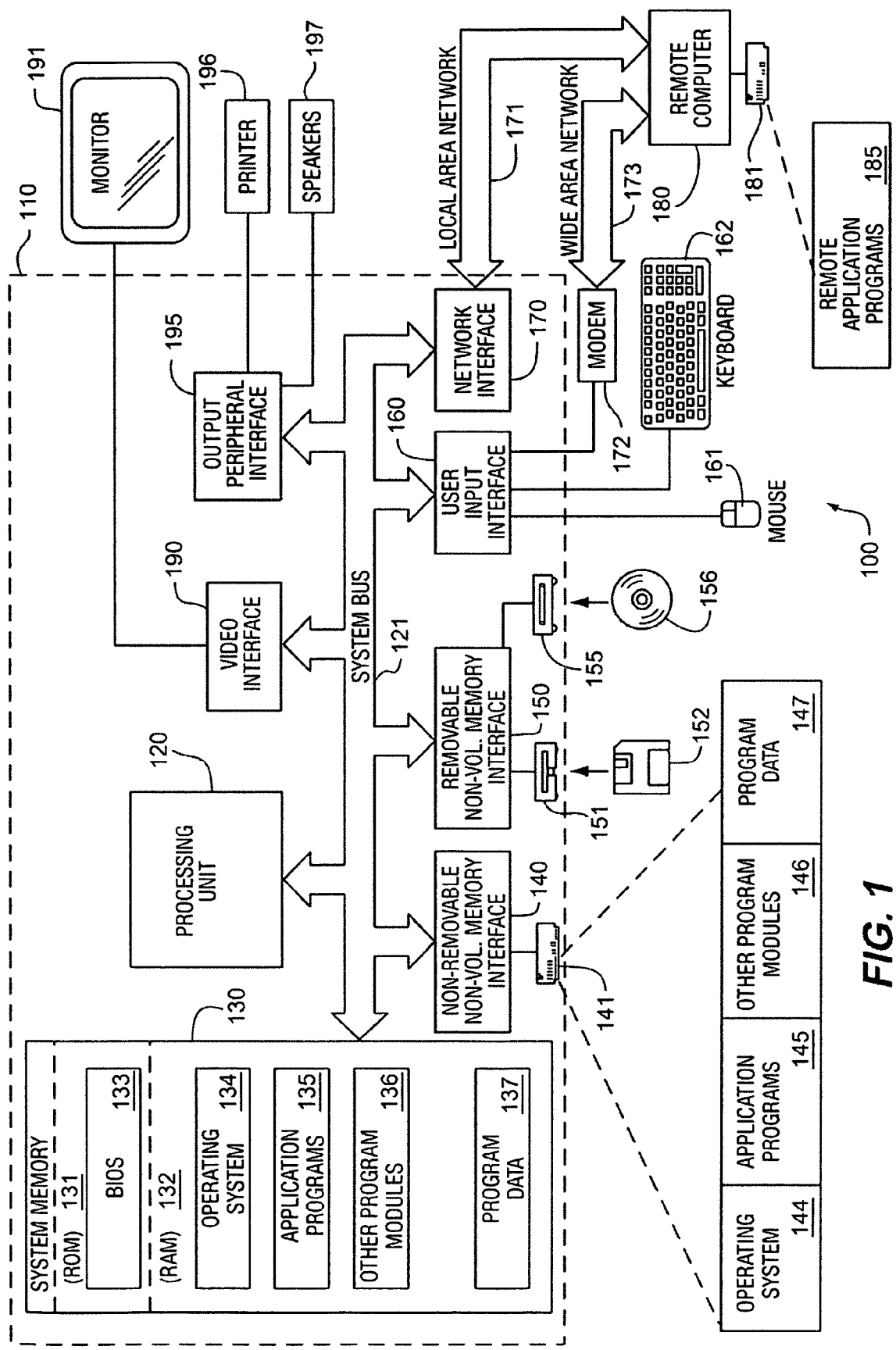
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
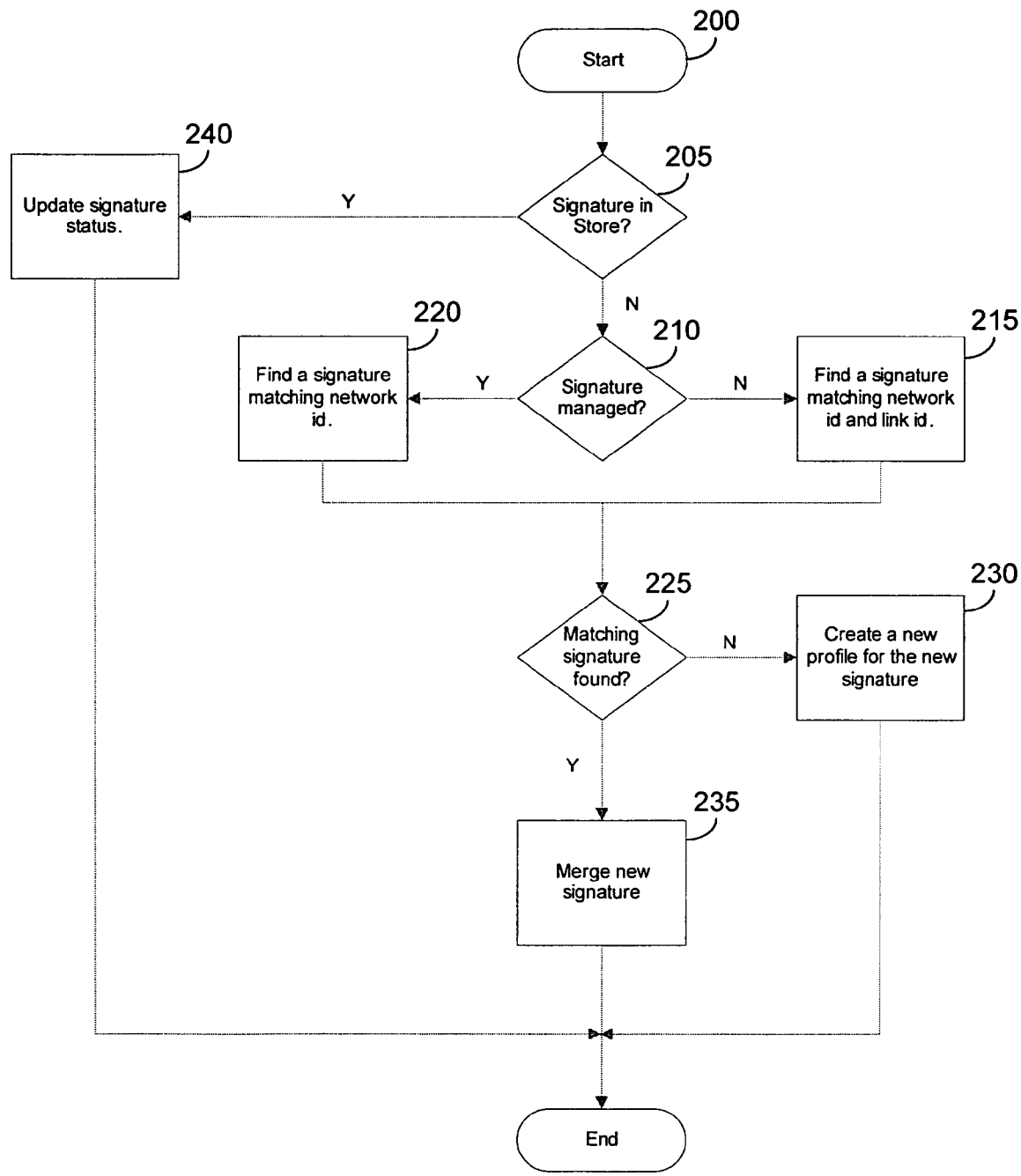
FIG. 2 is an illustration of a method of network identification in accordance with the claims.

FIG. 2 is an illustration of a method of network identification in accordance with the claims. At block 200, the method may begin by obtaining a network signature from a network to which the device connects. At block 205, the method may determine whether the network signature is recognized by the device. The device may have stored network signatures from networks it has connected to in the past. At block 210, if the network signature is not recognized, the method may determine whether the network signature is managed. At block 215, if it is determined that the signature is not managed, the method may attempt to obtain a signature matching network ID and link ID. At block 220, if it is determined that the signature is managed, the method may attempt to obtain a signature matching network ID. At block 225, the method may determine whether a matching network signature is found. The logic may be as follows: If a new managed network signature has the same Network ID and value for the authenticated/not authenticated flag as a network signature already associated with a network profile, then the new network signature will be added to the network profile that includes the matching network signature. Otherwise, a new network profile will be created for the new managed network signature. If a new unmanaged network signature has the same Network ID and Link ID as a network signature already associated with a network profile, then the new network signature will be added to the network profile that includes the matching network signature. Otherwise, a new network profile will be created for the new unmanaged network signature.

At block 230, if a matching network signature is not found, the method may create a new profile for the new network signature. The default name for a new network profile may be the DNS suffix of the network. If the DNS suffix is already the name of another network profile, then sequential numbering will be included in the name of the new network profile (i.e. microsoft.com, microsoft.com 2, microsoft.com 3, etc.). The default icon for the profile will be a generic network profile icon. At block 235, if a matching network signature is found, the method may merge the new network signature with the found network signature. At block 240, if a network signature is recognized by the device at block 205, the method may update the network signature status. By updating network signature status, the method may update whether a network signature was connected or not or whether a network signature was authenticated or not.

A network signature may be a network ID, a link ID and a hop ID. The network ID may be a unique ID corresponding to a site, for example, Microsoft.com. Of the network, link and hop IDs, the network ID is the least specific. A link ID may be a unique ID corresponding to a subnet, for example, a MAC gateway address. This ID is more specific than the network ID, but less specific than the hop ID. A hop ID may be a unique ID corresponding to a segment, for example, a specific access point. Of the network, link and hop IDs, the hop ID is the most specific. A managed network may be a network with a domain controller and an unmanaged network may be a network without a domain controller. The following are several examples of the method.

Separate Profiles for Two "Identical" Home Networks

Abby and her neighbor purchase identical routers, and simply plug them into power and their cable modems. Abby connects her laptop to her home network and the first network profile is automatically created. Some time later, Abby visits her neighbor and decides to connect her laptop to her neighbor's network. After she connects, the neighbor's network is identified as a different network and assigned a new profile.

Same Profile for Wired and Wireless Connections to a Network

Abby typically connects her laptop to her home network via 802.11. Today, however, she plans to transfer some very large files so she decides to connect to her home network via Ethernet. After she connects, Windows reports that she is connected to the same network profile as when she is connected via 802.11.

One Profile for a Domain

Ed's corporation has a campus with multiple buildings and many wireless access points. Though Ed uses his laptop in most of these buildings and therefore, connects to many access points, he is always shown as connected to the same network profile. Additionally, if he VPNs into work from home, he is shown as connected to the same network profile.

Automatic Switching of Default Printer

Patrick frequently uses his laptop at work and at home. He configures his laptop so that it automatically switches the default printer based upon the network profile to which it is currently connected. When at work, the default printer automatically switches to be the printer in his office. When at home, the default printer automatically switches to be the printer in his study, even if he is also VPNed into work.

Network Profile-Based Firewall Port Management

Patrick almost always has his laptop with him, and he connects to multiple networks. On some networks, he wants to interact with other computers and devices on the network, so he chooses to open the discovery ports in Windows Firewall when connected to these networks. Patrick, however, uses other networks simply for Internet access and wants to maximize his security on these networks, so he chooses to close the discovery ports in Windows Firewall when connected to these networks.

FIG. 3 may be some examples of network profiles that are created when laptop connects to home or office network.

Scenario 1—When the laptop 300 is connected to internet 305 through an Internet Service Provider at home, a network profile "Home" is created by the Network Profile Service.'

Scenario 2—When the laptop 300 is connected to corporate network, another network profile "Work" is created by the Network Profile Service. "Home" network profile remains inactive.

Scenario 3—When laptop 300 is connected to network at home through the ISP, "Work" network profile remains inactive. However, when a VPN connection is established to the corporate network, "Work" network profile also becomes active.

FIG. 4 may be an illustration of a programmatic view of one manner of executing the method. This example may be tailored to the Microsoft Windows operating system but other systems are contemplated. The Network Profile Service 400 may be a win32 service which hosts all the COM objects. It may run in svchost process in LocalServiceNoNetwork account. The Network Profile Service 400 may need to persist its state in the registry and update it whenever there is a change in the state of connected networks. Therefore, its startup type may be automatic.

The Network Profile Manager 405 may be a singleton COM object which monitors network connectivity by registering with the Network Location Awareness ("NLA") service 410, provides network change notifications to interested clients and exposes a set of APIs 415 for Network Profile Management such as Network Profile Management UIs 420.

The Network Profile Enumerator 425 may be a COM object that provides an interface to enable enumeration of available, connected and saved Network Profiles 430, such as those in store 435.

The Network Profile 430 may be a COM object that represents a network on the system. For example, Abby's Network, Home Network etc.

The Network Signature Enumerator 440 may be the COM object that provides an interface to enumerate network signatures.

The Network Signature 445 may be a COM object that provides an interface to represent a network signature.

The architecture for the method may be illustrated in FIG. 5. The network profiles management user interface may be divided into three largely independent components:

Network profile property pages 505;
Network profiles folder 510; and
Network status and options page 515.

According to the method, there may be a property page for each network profile. This property page may a few functions:

Allow the user to change the name and icon for the network profile;

Show the network profile's current status;

Allow the user to manage the signatures associated with the network profile; and Allow the user to launch network connection status and property window.

The Network Profiles Folder may be the central place for managing network profiles. It may allow the user to rename profile and launch Network Profile Property pages. It may be an implementation of IShellFolder interface and other Shell extension related interfaces to provide features like context menu and drag and drop. It may have a list view showing the information from Network Profile Services.

The Network Status and Options Page may be the central place for viewing the status of the user session's overall network connectivity, launching relevant tasks and linking to the various components for managing network configuration. This fold may be implemented by using the call processing language "CPL") framework 517 and hosting a network minimap provided by netmap.dll 535.

In Profile Manager, CProfileMgr 520 may be a base class for the Network profile property pages, the Network profiles folder and the Network status and options page to inherit and may be responsible for getting and setting properties to/from the Network Profile Services 525. This class may also provide functions for getting profile list, signature list, icon list ... etc. The Network Profile Services 525 may provide network profile and signature data and notifications. The Netshell.dll 530 may host the Connection Status and Property pages that the method needs to launch. The Netmap.dll 535 may provide the network mini-map implementation that the method may host in the Status and Options folder component. The Network Communications Services Interface "NCSI") 540—Network Profile Services may provide the state of a profile whether it is connected or not. But, it may not distinguish whether it has Internet connectivity or just local connectivity as NCSI may help in that regard. NCSI may be built into NLA. The Netman.dll 545 may provide the network connection data (icon provided by netshell/dll).

Programming Model

The programming model may be a COM based interface that supports automation. The clients may connect to the Network Profile Service 525 by instantiating a Profile Manager object. Through the Profile Manager object, the clients may enumerate or register for change notifications. The COM APIs fall into the following classes.

Network Profile Management API—This set of APIs may allow creating and deleting network profiles as well as moving network signatures from one network profile to another.

Network Profile Enumeration API—This set of APIs may allow enumerating network profiles and the network signatures therein.

Asynchronous Notification API—This set of API may allow registering for notifications when state of a network profile changes, or it is deleted/created.

Component Interaction

Detecting Networks

The Network Profile Service 525 may detect the presence of a network by registering with NLA 540. Whenever a network connection is established or its state changes, the Network Profile Service 525 may get a notification from NLA 540. NLA 540 may provide a unique signature identifying the network interface along with some characteristics of the network interface Managing NLA Signatures Network Profile Service 525 may use NLA API to parse the NLA signature in terms of its underlying components which may be NetworkID, LinkID and HopID. The NetworkID and possibly the LinkID may be used to determine if it is a new network or an existing network. Other characteristics provided by NLA may help determine if the network is managed or unmanaged.

Managing Network Profiles

As described in relation to FIG. 2, network profiles 505 (FIG. 5) may reflect the network environment to which a computer is connected. The profiles may consist of one or more network signatures. If a signature is detected that doesn't already exist in a profile or cannot be merged into an existing profile then, Network Profile Service may create a new network profile. However, if the new signature is already part of a network profile then, the status of the network profile may be updated to reflect the change in the state.

Network Profile Store

The Network Profile Service may use the registry to save all the information about network profiles and specific pieces of NLA signatures. During the boot process, it may initialize its internal data structures by reloading the information from the registry.

The following information about a network profile may persist in the registry.

ID
Name
Description
Icon ID
Bits indicating managed/unmanaged and authenticated/unauthenticated flag
Local time and date created The following information about a network signature may persist in the registry.

ID
Description
Bits indicating managed/unmanaged and authenticated/unauthenticated flag
ID of the owning network profile Managing Networks in Different Compartments Though network profiles are visible to all users, Network Profile Service may ensure that the state of a network profile is correctly reflected to users of different session. To do this, the Network Profile may takes into account the compartment id of the networks. For example, if a user makes a VPN connection, the network profile containing the network signature corresponding to the VPN connection may appear connected to the only user that made the VPN connection. The network profile may appear disconnected to the rest of the users. Additionally, the notification of the connection may be sent to only those applications that are running in the context of the user of the active VPN connection.

The method may also expose application programming interfaces "APIs") to assist using the new functionality. The Network Profiles Service will expose APIs that provide the following functionality:

APIs for all users:
  Enumerate each of the following (independently):
    Connected network profiles
    Disconnected network profiles
    All network profiles
    Network signatures for a network profile
    Network interfaces for a connected network profile
    Network interfaces for a connected network signature
  Status:
    Connected/disconnected for a network profile
    Connected/disconnected for a network signature
    Managed/unmanaged for a network profile
    Authenticated/not authenticated for a network profile Properties:
  Get/set friendly name for a network profile
  Get/set icon for a network profile (should be able to specify an image file that will be converted to an icon)
  Get/set description for a network profile
  Get date network profile was created
  Get date network profile was last connected
APIs for administrators only:
  Move network signature from one network profile to another
  Delete network signature
  Create network profile
  Delete network profile
  Merge network profiles
Notifications The method may also provide notifications of the following events to components that register to receive the notifications:
  Network profile connect/disconnect
  Network profile add/delete
  Network signature connected/disconnected
  Change to network profile properties
  The specific APIs may be as follows:
  INetworkProfileManager The interface may be implemented by a singleton COM object. It may provide a set of methods to perform network profile management functions. The following is a description of various tasks that may be supported by this interface.

Creating a Network Profile

CreateNetworkProfile method may create a new network profile with the specified name and returns a pointer to INetworkProfile interface pointer on success.

HRESULT CreateNetworkProfile ([in] LPWSTR szProfileName,
  [out] INetworkProfile **ppProfile);
Network Profile Enumerator EnumNetworkProfiles may return an interface to enumerate Network Profiles that are connected, disconnected or all. NP_ENUM_PROFILE flag may control the type of network profiles to enumerate.

```
HRESULT EnumNetworkProfiles ([in] NP_ENUM_NETWORK_PROFILE
    [out] IEnumNetworkProfile **ppEnum);
typedef [v1_enum] enum tagNP_ENUM_NETWORK_PROFILE
{
    NP_ENUM_NETWORK_PROFILE_CONNECTED = 0x01,
NP_ENUM_NETWORK_PROFILE_DISCONNECTED = 0x02,
    NP_ENUM_NETWORK_PROFILE_ALL = 0x03
} NP_ENUM_NETWORK_PROFILE;
```

NP_ENUM_NETWORK_PROFILE_CONNECTED may cause the enumerator to return network profiles that are connected at the time the IEnumNetworkProfile enumerator is instantiated. cOnce IEnumNetworkProfile enumerator interface is returned to the caller, the list of connected network profiles may be locked for that instance of the enumerator. If a network profile becomes disconnected during the enumeration, the network profile may not be dropped from the list of this enumerator. If a new network profile is created by the network profile service during the enumeration then, it may not be included in the enumeration.

NP_ENUM_NETWORK_PROFILE_DISCONNECTED may cause the enumerator to return network profiles that are disconnected at the time the IEnumNetworkProfile enumerator is instantiated. Once IEnumNetworkProfile enumerator interface is returned to the caller, the list of disconnected network profiles may be locked for that instance of the enumerator. If a network profile becomes connected during the enumeration, the network profile may not be dropped from the list of this instance of enumerator. If a new network profile is created by the network profile service during the enumeration then, it may not be included in the enumeration.

NP_ENUM_NETWORK_PROFILE_ALL may cause the enumerator to return all the network profiles that are in the system irrespective of their state. If a new network profile is created by the network profile service during the enumeration, then it may be included in the enumeration list. The caller may have to reset the point of enumeration if it is already at the end to get the newly created network profile.

In all types of enumeration, if a network profile is deleted, it may be removed from the enumerator's list.

Deleting a Network Profile

DeleteNetworkProfile may delete a network profile.

HRESULT DeleteNetworkProfile ([in] GUID *pProfileId);

A connected or managed network profile may not be deleted. The function may fail if it is called on a connected or managed network profile. Once a network profile is deleted, the only method that may successfully work on INetworkProfile interface is GetId. All other methods may fail with error code E_UNEXPECTED.

Deleting a Network Signature

DeleteNetworkSignature may delete a network signature.

HRESULT DeleteNetworkSignature ([in] LPWSTR szSignatureId);

An active network signature may not be deleted. The function may fail if it is called on an active signature. Once a network signature is deleted, the only method that may successfully work on INetworkSignature interface is GetId. All other methods may fail with error code E_UNEXPECTED.

IEnumNetworkProfile

IEnumNetworkProfile may be a standard enumerator for network profiles. It may enumerate connected, disconnected or all network profiles.

Standard Enumeration Methods

```
HRESULT Next([in] ULONG celt,
    [out, size_is(celt), length_is(*pceltFetched)]
    INetworkProfile **rgelt,
    [out] ULONG *pceltFetched);
HRESULT Skip([in] ULONG celt);
HRESULT Reset ( );
HRESULT Clone([out] IEnumNetworkProfile **ppenum);
IEnumNetworkSignature
```

IEnumNetworkSignature may be a standard enumerator for NLA signatures. It may enumerate connected or active, disconnected or all network signatures within a profile. The interface may be obtained from INetworkProfile interface.

Standard Enumeration Methods

```
HRESULT Next([in] ULONG celt,
    [out, size_is(celt), length_is(*pceltFetched)]
    INetworkSignature **rgelt,
    [out] ULONG *pceltFetched);
HRESULT Skip([in] ULONG celt);
HRESULT Reset ( );
HRESULT Clone([out] IEnumNetworkSignature **ppenum);
```

```
INetworkProfile
INetworkProfile represents a network profile.
Name of the Network Profile.
```

GetName may return the name of the network profile. The caller may be responsible for releasing the memory pointed to by *ppszProfileName by calling CoTaskMemFree.

HRESULT GetName ([out, string] LPWSTR *ppszProfileName);

Rename may rename a network profile.

HRESULT Rename ([in, string] LPWSTR pszProfileNewName);

The name of the network file may be MAX_PROFILE_NAME_LEN long. Two may have the same name. So, it may not bw recommended to use the name to identify a network profile. The name may be required to not contain \, /, :, *, ?, ", <, >, | tab characters.

Description of the Network Profile.

GetDescription may return a description string for the network profile. The caller may be responsible for releasing the memory pointed to by *ppszDescription by calling CoTaskMemFree, HRESULT GetDescription ([out, string] LPWSTR *ppszDescription);

SetDescription may set a new description of the network profile.

HRESULT SetDescription ([in, string] LPWSTR pszDescription);

The description of a network profile may be MAX_PROFILE_DESC_LEN.

Identifier of the Network Profile

GetId may return a unique identifier of a network profile. The caller may be responsible for allocating the buffer pointed to by pguidProfileId and should be large enough to hold a GUID.

HRESULT GetId ([out] GUID *pguidProfileId);

Icon of the Network Profile

GetIcon may return the icon of a network profile in base64 encoded format. The caller may be responsible for releasing the memory pointed to by *ppIconData using CoTaskMemFree function.

HRESULT GetIcon ([out] DWORD *pdwBytes,
[out, size_is(, *pdwBytes)] BYTE **ppIconData);

SetIcon may set a new icon for a network profile. pIconData may contain the icon bitmap in base64 encoded format.

```
HRESULT SetIcon ([in] DWORD dwBytes,
        [in, size_is(dwBytes)] BYTE *pIconData);
Type of Network Profile
GetType may return the type of network profile.
HRESULT GetType ([out] NP_NETWORK_PROFILE_TYPE
*pProfileType);
Types of a network profile are may be as listed below.
typedef [v1_enum] enum tagNP_NETWORK_PROFILE_TYPE
{
    NP_NETWORK_PROFILE_MANAGED = 0x01,
    NP_NETWORK_PROFILE_AUTHENTICATED = 0x02
} NP_NETWORK_PROFILE_TYPE;
```

Time Network Profile Created and Connected.

GetTimeCreated may return in FILETIME format the local date and time when the network profile was created and connected.

```
HRESULT    GetTimeCreatedAndConnected    ([out]    DWORD
*pdwLowDateTimeCreated,
        out] DWORD *pdwHighDateTimeCreated,
        [out] DWORD *pdwLowDateTimeConnected,
        [out] DWORD *pdwHighDateTimeConnected);
```

If the network profile has never been connected, the pdwLowDateTimeConnected and pdwHighDateTimeConnected may be zero.

State of the Network Profile GetProfileState may return the current state of the network profile.

HRESULT GetProfileState ([out] NP_NETWORK_PROFILE_STATE *fState);

A network profile may be in one of the following states.

```
typedef [v1_enum] enum tagNP_NETWORK_PROFILE_STATE
{
    NP_NETWORK_PROFILE_CONNECTED    = 0x01,
    NP_NETWORK_PROFILE_DISCONNECTED = 0x02
} NP_NETWORK_PROFILE_STATE;
```

NP_PROFILE_STATE_CONNECTED may mean that at least one of the NLA signatures in the network profile is active.

NP_PROFILE_STATE_DISCONNECTED may mean that none of the NLA signatures in the network profile is active.

List of Interfaces

GetInterfaces may return an array of interface guids of all the connected network signatures in the network profile. If the network profile is not connected i.e. none of its network signatures is connected, *pdwCount may be set to zero and *ppIntefaces may be set to NULL. The caller may be responsible for releasing memory of each element of the array as well as the array buffer pointed to by *ppInterface.

```
HRESULT GetInterfaces ([out] DWORD *pdwCount,
        [out, size_is( ,*pdwCount)] LPWSTR
            *ppInterfaces);
```

Network Signature Enumerator

EnumNetworkSignatures may return an NLA signature enumerator that enumerates signatures within the profile.

```
HRESULT              EnumNetworkSignatures          ([in]
    NP_ENUM_NETWORK_SIGNATURE flags,
        [out] IEnumNetworkSignature
            **ppEnum);
```

The flags may indicate the type of enumerator to return. This may be one of the following values.

```
typedef [v1_enum] enum tagNP_ENUM_NETWORK_SIGNATURE
{
    NP_ENUM_NETWORK_SIGNATURE_CONNECTED = 0x01,
    NP_ENUM_NETWORK_SIGNATURE_DISCONNECTED = 0x02,
    NP_ENUM_NETWORK_SIGNATURE_ALL = 0x03
} NP_ENUM_NETWORK_SIGNATURE;
```

NP_ENUM_NETWORK_SIGNATURE_CONNECTED may return an enumerator for connected or active NLA signatures. Once IEnumNetworkSignature interface is returned to the caller, the list of connected network signatures may be locked for that instance of the enumerator. If a network signature becomes disconnected during the enumeration, the network signature may not be dropped from the list of this instance of the enumerator. If a new network signature is created by the network profile service during the enumeration then, it may not be included in the enumeration.

NP_ENUM_NETWORK_SIGNATURE_DISCONNECTED may returns an enumerator for disconnected NLA signatures. Once IEnumNetworkSignature interface is returned to the caller, the list of disconnected network signatures may be locked for that instance of the enumerator. If a network signature becomes connected during the enumeration, the network signature may not be dropped from the list of this instance of the enumerator. If a new network signature is created by the network profile service during the enumeration then, it may not be included in the enumeration.

NP_ENUM_NETWORK_SIGNATURE_ALL may returns an enumerator for all NLA signatures. If a new network signature is created by the network profile service during the enumeration then, it may be included in the enumeration list. The caller may have to reset the point of enumeration if it is already at the end to get the newly created network signature.

In all types of enumeration, if a network signature is deleted, it may be removed from the enumerator's list.

INetworkSignature

INetworkSignature may represent an NLA signature.

Identifier of the Network Signature

GetId may return a unique identifier of a network signature. The caller may be responsible for releasing the memory pointed to by *ppszSignatureId by calling CoTaskMemFree.

HRESULT GetId [out] LPWSTR *ppszSignatureId);

Id of the Network Profile

GetNetworkProfileId may return the identifier of the network that contains the network signature.

HRESULT GetNetworkProfileId([out] GUID *pProfileId);

Description of the Network Signature

GetDescription may return a description string for the network signature. The caller may be responsible for releasing the memory pointed to by *ppszDescription by calling CoTaskMemFree, HRESULT GetDescription ([out, string] LPWSTR *ppszDescription);

SetDescription may set a new description of the network signature.

HRESULT SetDescription ([in, string] LPWSTR pszDescription);

The description of a network profile may be MAX_SIGNATURE_DESC_LEN. The default description of a newly created network signature may be the DNS suffix of the network identified by the network signature.

Type of Network Signature

GetType may return the type of network signature.

HRESULT GetType ([out] NP_NETWORK_SIGNATURE_TYPE *pSignatureType);

The types of a network signature may be as listed below.
typedef[v1_enum] enum tagNP_NETWORK_SIGNATURE_TYPE
{
    NP_NETWORK_SIGNATURE_MANAGED = 0x01, -continued NP_NETWORK_SIGNATURE_AUTHENTICATED = 0x02
} NP_NETWORK_SIGNATURE_TYPE;
List of Interfaces GetInterfaces may return an array of interface guids of a network signature. If the signature is not connected, the function may return NULL in *ppInterfaces and *pdwCount is set to zero. The caller may be responsible for releasing memory of each element of the array as well as the array buffer pointed to by *ppInterface.

HRESULT GetInterfaces ([out] DWORD *pdwCount, [out, size_is( ,*pdwCount)] LPWSTR *ppInterfaces);

Moving a Network Signature to another Network Profile

MoveTo may moves a network signature into another network profile specified by pProfile.

HRESULT MoveTo ([in] INetworkProfile *pProfile);

A network signature may not be moved out of or into a managed network profile.

NETWORK PROFILE SERVICE EVENT NOTIFICATION

The COM object with CLSID CLSID_CNetworkProfileManager may implement a connection point for notifications of changes in network profiles and network signatures. Below may be a description of the sink interface for various notifications. The callback methods of the sink interface of a client may or may not receive all the events on the same thread. However, until the callback method has returned, the client may not receive another event.

INotifyNetworkProfileEvents

INotifyNetworkProfileEvents may be a sink interface that a client will implement to get network profile related events.

OnNetworkProfileAdded

OnNetworkProfleAdded method may be called when a new network profile is added. pProfile is a pointer to the new network profile interface. The client may be responsible for releasing pProfile interface.

HRESULT OnNetworkProfileAdded ([in] INetworkProfile *pProfile);

The return value from the method may be ignored.

OnNetworkProfileDeleted

An OnNetworkProfleDeleted method may be called when a network profile is deleted. pguidProfile may identify the network profile that has been deleted.

HRESULT OnNetworkProfileDeleted ([in] const GUID *pguidProfile);

The return value from the method may be ignored.

OnNetworkProfileConnected

A OnNetworkProfleConnected method may be called when a disconnected network profile is connected. pguidProfile may identify the network profile that has connected.

HRESULT OnNetworkProfileConnected ([in] const GUID *pguidProfile);

The return value from the method may be ignored.

OnNetworkProfileDisconnected

A OnNetworkProfleDisconnected method is called when a connected network profile may be disconnected. pguidProfile may identify the network profile that has disconnected.

HRESULT OnNetworkProfileDisconnected ([in] const GUID *pguidProfile);

The return value from the method may be ignored.
OnNetworkProfilePropertyChange

OnNetworkProfilePropertyChange method may be called when one or more properties of the network profile change. pguidprofile may identify the network profile.

HRESULT OnNetworkProfilePropertyChange ([in] const GUID
*pguidProfile);

The return value from the method may be ignored.
OnNetworkSignatureAdded

A OnNetworkSignatreAdded method may be called when a new network signature is added. pguidProfile may identify the network profile containing the network signature and pSignature may be the interface representing the network signature. The client may be responsible for releasing pSignature interface.

HRESULT OnNetworkSignatureAdded ([in] const GUID *pguidprofile,
[in] INetworkSignature *pSignature);

A return value from the method may be ignored.
OnNetworkSignatureDeleted

A OnNetworkSignatreDeleted method may be called when a network signature is deleted. pguidProfile may identify the network profile containing the network signature and pszSignatureId may be the id of the network signature.

HRESULT OnNetworkSignatureDeleted ([in] const GUID *pguidprofile,
[in] LPWSTR pszSignatureId);

A return value from the method may be ignored.
OnNetworkSignatureConnected

A OnNetworkSignatreConnected method may be called when a network signature is connected. pguidProfile identifies the network profile containing the network signature and pszSignatureId may be the id of the network signature.

HRESULT OnNetworkSignatureConnected ([in] const GUID *pguidprofile,
[in] LPWSTR pszSignatureId);

A return value from the method may be ignored.
OnNetworkSignatureDisconnected

OnNetworkSignatreDisconnected method may be called when a network signature is disconnected. pguidProfile may identify the network profile containing the network signature and pszSignatureId may be the id of the network signature.

HRESULT OnNetworkSignatureDisconnected ([in] const GUID
*pguidprofile,
[in] LPWSTR pszSignatureId);

A return value from the method may be ignored.
OnNetworkSignaturePropertyChange

A OnNetworkSignaturePropertyChange method may be called when one or more properties of a network signature change. pszSignatureId may identify the network signature.

HRESULT OnNetworkProfilePropertyChange ([in] const GUID
*pguidProfile);

Other APIs may also be used. The functionality may be similar to the APIs previously discussed, with some changes to the specific calls. Some examples follow.

```
interface INetworkListManager: IUnknown
{
    typedef [v1_enum] enum tagNP_ENUM_NETWORK
    {
        NP_ENUM_NETWORK_CONNECTED   = 0x01,
        NP_ENUM_NETWORK_DISCONNECTED = 0x02,
        NP_ENUM_NETWORK_ALL          = 0x03
    } NP_ENUM_NETWORK;
    HRESULT EnumNetworks ([in] NP_ENUM_NETWORK flags,
                [out] IEnumNetwork **ppEnum);
    HRESULT  EnumNetworkInterfaces  ([out]  IEnumNetworkInterface **ppEnum);
    HRESULT GetNetwork([in] const GUID *pNetworkId,
                [out] INetwork **ppNetwork);
    HRESULT GetNetworkInterface ([in] DWORD dwBytes,
                [in] const BYTE *pInterfaceId,
                [out] INetworkInterface **ppInterface);
    HRESULT      GetBandwidthEstimation      ([out]     IBandwidthEstimation **ppBandwidthEstimation);
}
interface IEnumNetwork: IUnknown
{
    HRESULT Next([in] ULONG celt,
            [out, size_is(celt), length_is(*pceltFetched)] INetwork **rgelt,
            [out] ULONG *pceltFetched);
    HRESULT Skip([in] ULONG celt);
    HRESULT Reset( );
    HRESULT Clone([out] IEnumNetwork **ppenum);
}
interface INetwork: IUnknown
{
    HRESULT GetName ([out, string] LPWSTR *ppszNetworkName);
    HRESULT GetDescription ([out, string] LPWSTR *ppszDescription);
    HRESULT SetDescription ([in, string] const LPWSTR pszDescription);
    HRESULT GetId ([out] GUID *pguidNetworkId);
    HRESULT Rename ([in, string] const LPWSTR pszNetworkNewName);
    HRESULT GetIcon ([out] DWORD *pdwBytes,
            [out, size_is(, *pdwBytes)] BYTE **ppIconData);
    HRESULT SetIcon ([in] DWORD dwBytes,
            [in, size_is(dwBytes)] const BYTE *pIconData);
    typedef [v1_enum] enum tagNP_NETWORK_TYPE
```

```
    {
        NP_NETWORK_MANAGED     = 0x01,
        NP_NETWORK_AUTHENTICATED = 0x02
    } NP_NETWORK_TYPE;
    HRESULT GetType ([out] NP_NETWORK_TYPE *pNetworkType);
    HRESULT    GetTimeCreatedAndConnected    ([out]    DWORD
*pdwLowDateTimeCreated,
                    [out] DWORD *pdwHighDateTimeCreated,
                    [out] DWORD *pdwLowDateTimeConnected,
                    [out] DWORD *pdwHighDateTimeConnected);
    typedef [v1_enum] enum tagNP_NETWORK_STATE
    {
        NP_NETWORK_CONNECTED   = 0x01,
        NP_NETWORK_DISCONNECTED      = 0x02,
        NP_NETWORK_CONNECTIVITY_V4_LOCAL    = 0x4,
        NP_NETWORK_CONNECTIVITY_V4_INTERNET = 0x8,
        NP_NETWORK_CONNECTIVITY_V6_LOCAL    = 0x10,
        NP_NETWORK_CONNECTIVITY_V6_INTERNET = 0x20
    } NP_NETWORK_STATE;
    HRESULT GetState ([out] NP_NETWORK_STATE *pfState);
    HRESULT    EnumNetworkInterfaces    ([out]    IEnumNetworkInterface
**ppEnum);
}
interface IEnumNetworkInterface: IUnknown
{
    HRESULT Next([in] ULONG celt,
            [out, size_is(celt), length_is(*pceltFetched)] INetworkInterface **rgelt,
            [out] ULONG *pceltFetched);
    HRESULT Skip([in] ULONG celt);
    HRESULT Reset( );
    HRESULT Clone([out] IEnumNetworkInterface **ppenum);
}
interface INetworkInterface: IUnknown
{
    HRESULT GetId ([out] DWORD *pdwBytes,
            [out, size_is( ,*pdwBytes)] BYTE **ppbInterfaceId);
    HRESULT GetInterfaceGuid ([out] GUID *pInterfaceGuid);
    HRESULT GetNetworkId ([out] GUID *pNetworkId);
    typedef [v1_enum] enum tagNP_NETWORK_INTERFACE_TYPE
    {
        NP_NETWORK_INTERFACE_MANAGED    = 0x01,
        NP_NETWORK_INTERFACE_AUTHENTICATED = 0x02
    } NP_NETWORK_INTERFACE_TYPE;
    HRESULT    GetType    ([out]    NP_NETWORK_INTERFACE_TYPE
*pInterfaceType);
    typedef [v1_enum] enum tagNP_INTERFACE_STATE
    {
        NP_INTERFACE_CONNECTED    = 0x01,
        NP_INTERFACE_DISCONNECTED = 0x02,
        NP_INTERFACE_CONNECTIVITY_V4_LOCAL    = 0x4,
        NP_INTERFACE_CONNECTIVITY_V4_INTERNET = 0x8,
        NP_INTERFACE_CONNECTIVITY_V6_LOCAL    = 0x10,
        NP_INTERFACE_CONNECTIVITY_V6_INTERNET = 0x20
    } NP_INTERFACE_STATE;
    HRESULT GetState ([out] NP_INTERFACE_STATE *pState);
}
cpp_quote("#if 0")
    typedef struct_SOCKADDR_STORAGE
    {
        BYTE sock_data[128];
    } SOCKADDR_STORAGE, *PSOCKADDR_STORAGE;
cpp_quote ("#endif")
typedef struct tagBANDWIDTH_PARAMS
{
    SOCKADDR_STORAGE SourceIP;
    SOCKADDR_STORAGE DestinationIP;
} BANDWIDTH_PARAMS, *PBANDWIDTH_PARAMS;
typedef struct tagBANDWIDTH_DATA
{
    SOCKADDR_STORAGE SourceIP;
    SOCKADDR_STORAGE DestinationIP;
    ULONG    InboundBandwidthEstimate;
    ULONG    OutboundBandwidthEstimate;
    ULONG    InboundBandwidthInstability;
    ULONG    OutboundBandwidthInstability;
    BOOL     InboundBandwidthPeaked;
    BOOL     OutboundBandwidthPeaked;
} BANDWIDTH_DATA, *PBANDWIDTH_DATA;
interface IBandwidthEstimation: IUnknown
```

-continued

```
{
    HRESULT Begin ([in] DWORD dwCount,
            [in,   size_is(dwCount)]   const   BANDWIDTH_PARAMS
*pBandwithParams);
    HRESULT Get ([in] const GUID *pNetworkId,
            [in] const GUID *pInterfaceGuid,
            [out] DWORD *pdwCount,
            [out,       size_is(       ,*pdwCount)]   BANDWIDTH_DATA
**ppbBandwidthData);
    HRESULT End( );
}
interface INotifyNetworkEvents: IUnknown
{
    HRESULT OnNetworkAdded ([in] const GUID *pNetworkId);
    HRESULT OnNetworkDeleted ([in] const GUID *pNetworkId);
    HRESULT OnNetworkConnected ([in] const GUID *pNetworkId);
    HRESULT OnNetworkDisconnected ([in] const GUID *pNetworkId);
    typedef [v1_enum] enum tagNP_NETWORK_PROPERTY_CHANGE
    {
        NP_NETWORK_INTERFACE     = 0x01,
        NP_NETWORK_DESCRIPTION   = 0x02,
        NP_NETWORK_NAME          = 0x04,
        NP_NETWORK_ICON          = 0x08,
        NP_NETWORK_AUTHENTICATION = 0x10,
        NP_NETWORK_CONNECTIVITY  = 0x20
    } NP_NETWORK_PROPERTY_CHANGE;
    HRESULT OnNetworkPropertyChange ([in] const GUID *pNetworkId,
                        [in] NP_NETWORK_PROPERTY_CHANGE flags);
}
interface INotifyNetworkInterfaceEvents: IUnknown
{
    HRESULT OnNetworkInterfaceConnected ([in] const GUID *pNetworkId,
                        [in] DWORD dwBytes,
                        [in] const BYTE *pInterfaceId);
    HRESULT OnNetworkInterfaceDisconnected ([in] const GUID *pNetworkId,
                        [in] DWORD dwBytes,
                        [in] const BYTE *pInterfaceId);
    typedef [v1_enum] enum tagNP_INTERFACE_PROPERTY_CHANGE
    {
        NP_INTERFACE_CONNECTIVITY = 0x01
    } NP_INTERFACE_PROPERTY_CHANGE;
    HRESULT OnInterfacePropertyChange ([in] const GUID *pNetworkId,
                        [in] DWORD dwBytes,
                        [in] const BYTE *pInterfaceId,
                        [in] NP_INTERFACE_PROPERTY_CHANGE flags);
}
```

Event Reporting

The following table illustrates what kind of notification may be communicated to a client when an event occurs. Sometimes, a single event may trigger more than one type of notification. In such cases, the notifications may be reported in the order listed. The notifications may be sent to only those users who are affected by the event. Network Profile Service may take into account the compartment of the network signature associated with the event and notifies only those user sessions that belong this compartment.

| Event | Old State of Network Profile | New State of Network Profile | Notification |
| --- | --- | --- | --- |
| New Network Signature Connected | New Network Profile Created | Network Profile Connected | Network Signature Added. Network Profile Added. Network Signature Connected. Network Profile Connected. |
| | Merge into Disconnected Network Profile | Network Profile Connected | Network Signature Added. Network Signature Connected. Network Profile Connected. |
| | Merge into Connected Network Profile | Network Profile Connected | Network Signature Added. Network Signature Connected. |
| Existing Network Signature Connected | Network Profile Disconnected | Network Profile Connected | Network Signature Connected. Network Profile Connected. |
| | Network Profile | Network Profile | Network |

-continued

| Event | Old State of Network Profile | New State of Network Profile | Notification |
|---|---|---|---|
| | Connected | Connected | Signature Connected. |
| Network Signature | Network Profile Connected | Network Profile Connected | Network Signature Disconnected. |
| Disconnected | Network Profile Connected | Network Profile Disconnected | Network Signature Disconnected. Network Profile Disconnected. |
| Icon, Name or Description of Network Profile Changes | X | X | Network Profile Property Changed |
| Description of Network Signature Changed | X | X | Network Signature Property Changed. |

The method may also provide a user interface for users of the method.

Status Tab

The status tab may be the first and default tab for the network profile property pages. This tab may have two sections in order from top to bottom:

Icon and name
Status

Icon and Name

At the top left corner of the status tab, the network profile's small (32×32 pixels for example) icon may be shown. To the right of this icon may be a text box populated with the friendly name for the network profile. The user may change the name of the network profile in place.

Directly below the network profile name may be a button labeled "Change icon . . . " Clicking this button may open a "Change icon . . . " dialog on top of the property page for selecting an icon for the network profile. This dialog may include a list box of available icons. By default, the network profile's current icon may be selected. The user may select another icon from the list or click a "Browse . . . " button. Clicking this button may open the standard File Open dialog filtered to show only Images. If the user selects an icon in the File Open dialog, this icon may be added to the list in the "Change icon . . . " dialog and selected.

Finally, this dialog may include two more buttons:

"Ok"—Clicking this button may change the network profile's icon to the icon currently selected in the dialog's list and close the "Change icon . . . " dialog.

"Cancel"—Clicking this button may close the "Change icon . . . " dialog without changing the network profile's icon.

Status

Immediately below the icon and name section on the status tab, the current status of the network profile may be communicated. The status section may indicate that the network profile is in one of two possible states: disconnected or connected. If the network profile is unavailable, then a line reading "Status: Disconnected" may be added to the property page. If the network profile is connected, then a line reading "Status: Connected" may be added to the property page.

Additionally, a list of the network connections currently connected to the network profile may be enumerated in a listbox. Double clicking an item in the list may open the status page for the network connection on top of the network profile's property page. To the right of the listbox, there may be two buttons:

"Status"—Clicking this button may open the status page for the network connection on top of the network profile's property page.

"Properties"—Clicking this button may open the property page for the network connection on top of the network profile's property page.

Signatures Tab

This may be the second of two tabs on the network profiles property page. The tab may enumerate the signatures currently associated with the network profile and to allow the user to add, delete and move signatures. The primary element on this tab may be a list of the signatures associated with the network profile contained within a listbox.

All signatures for a managed network may be collapsed into a single signature in the listbox. Each unmanaged signature may be enumerated individually in the listbox.

Below the signatures listbox, there may be three buttons:

"Add . . . "—Clicking this button may open an "Add signature . . . " dialog on top of the network profile's property page. This dialog may contain a listbox that enumerates all of signatures not already associated with the selected network profile. (They are associated with the other network profiles.) At the bottom of the dialog, there may two buttons: "Add" and "Cancel." By default, no items may be selected in the list and the "Add" button may be grayed out. Once the user selects one or more signatures in the listbox, then the "Add" button may be made active. If "Add" is clicked, the selected signatures may be added to the specified network profile and the "Add signature . . . " dialog is closed. If "Cancel" is clicked, no changes may be made to the network profile and the "Add signature . . . " dialog is closed.

"Move . . . "—This button may be grayed out until one or more signatures are selected in the listbox. Clicking this button may open a "Move signature . . . "dialog on top of the network profile's property page. This dialog may contain a listbox that enumerates all other network profiles. By default, no items are selected in the list, and only one network profile may be selected at a time. At the bottom of this dialog, there may be three buttons:

"New . . . "—This button may be located in the bottom left of the dialog. Clicking this button may open a "New network profile . . . " dialog. This dialog may simply contain a textbox for entering the friendly name for a new network profile. At the bottom of this dialog, there may be two buttons: "Ok" and "Cancel." Clicking "Ok" may close the dialog and may add the new network profile (selected by default) to the list of network profiles in the "Move signature . . . " dialog. Clicking "Cancel" may simply close the dialog without making any changes to the "Move signature . . . " dialog.

"Move"—This button may be grayed out until a network profile in the listbox is selected. Clicking this button may move the selected signatures to the selected network profile and close the "Move signature . . . " dialog.

"Cancel"—Clicking this button may close the "Move signature . . . " dialog without making any changes.

"Delete"—This button may be grayed out until one or more signatures are selected in the listbox. Clicking this button may delete the selected signatures.

There may be several ways to access or enter the method such as through the Network Profiles Folder, the Network Status and Options Page and the Networking Tray Icon Flyout.

Network Profiles Folder

FIG. 6 may be an illustration of a sample Network Connection Folder in accordance with the method. The Network Profiles Folder may be the central place for managing network profiles. It may be implemented as a Shell Folder and as such, will have six major components: Breadcrumb Bar 605; Wordwheel 610; Taskbar 615; Pagespace 620; Listview View 625; and Preview Pane 630.

Breadcrumb Bar

The Breadcrumb Bar 605 in the Network Profiles Folder may display the Namespace of what is currently being displayed in the Listview View.

Wordwheel

The Wordwheel 610 may exhibit its standard behavior in the Network Profiles Folder. When a user types in the Wordwheel, the list currently being displayed in the Network Profiles Folder may be dynamically filtered to contain only those items that match what has been typed.

Taskbar

The tasks shown in the Taskbar 615 may be the same regardless of whether a network profile is connected or disconnected. These tasks (in order) may be:

View Status and Properties—Clicking this button may open the property page(s) for the selected network profile(s).
   Delete—Clicking this button may delete the selected network profile(s).

Pagespace

The pagespace 620 may display the following:
   Network Status and Options—This link may open the Network Status and Options page in frame;
   Computers and Network Devices—This link may open the Network Explorer in frame;
   Network Map—This link may open the Network Map in frame;
   Saved Networks—This may be the current view of the Network Profiles Folder; and
   Connections—This link may open the Network Connections Folder in frame.

Listview View

The Listview 625 may be the largest component of the Network Profiles Folder. It may contains the list of all network profiles that the current user session has permission to access.

FIG. 7 may be an illustration of a grouping of network icons. Extended tiles will be the default view in the Listview View.

Arrange Icons-By/Grouping

By default, the items in a list in the Network Profiles Folder may not be grouped, but may simply be listed in alphabetical order. A user, however, may group network profiles in the Network Profiles Folder by the following groupings:
   Name 700—This may be the friendly name for the network profile;
   Status 710—This may be one of two possible states: disconnected or connected;
   Last Connected 720—This may be the timestamp for when the system was last connected to the network profile; and
   Type 730—This may be one of two possible values: managed or unmanaged.

Single-clicking may select an item, and the preview pane updates to show metadata for the selected item. Double-clicking may select an item, and the preview pane updates to show metadata for the selected item. Additionally, the property page for the selected network profile may be opened in front of the Network Profiles Folder. Right-clicking may select an item, and the preview pane may update to show metadata for the selected item.

Additionally, a context menu with the following options may be shown:
   Status (in bold)—Clicking this option may open the property page for the selected network profile in front on the Network Profiles Folder.
   Create Shortcut—This may be standard Shell behavior for creating a shortcut to the item on the desktop.
   Delete—Clicking this option may delete the selected network profile.
   Rename—Clicking this option may allow the user to edit the name of the network profile in place.
   Properties—Clicking this option may open the property page for the selected network profile in front on the Network Profiles Folder.

Hover on an Item

Hovering over an item may show a tooltip with the following information (with a line break between each):
   Status
   Type
   Last Connected Right-Click on Background Right-clicking on the background may deselects all items.
Additionally, a context menu with the following options may be shown (These may be standard Shell options):
   View—This may be the standard Shell option that expands to a secondary context menu that allows the user to select in which view he/she would like to see the items in the list view (thumbnails, tiles, icons, details, etc.)
   Arrange Icons By
      Name
      Status
      Type
      Last Connected
      Show in Groups—This option can be checked/unchecked.
   Refresh—Clicking this option may cause the Network Profiles Folder to re-query the Network Profiles Service and regenerate the list shown in the listview.

Preview Pane

When no item is selected in the Network Profile Folder's Listview view 625 (FIG. 6), the preview pane 630 may contain a generic network profiles icon and the number of items in the current list. When an item is selected in the Network Profile Folder's Listview view 625, the preview pane 630 may contain the following details about the item:
   Item's Icon
   Friendly Name
   Status
   Type
   Last Connected Network Status and Options Page The Network Status and Options Page may be the central place for viewing the status of the user session's overall network connectivity, launching relevant tasks and linking to the various components for managing network configuration. It may be implemented as a Shell Folder and as such, will have some major components including a breadcrumb bar, a taskbar, a pagespace, a DUI View and a Preview Pane. The Breadcrumb Bar may display the Namespace of what is currently being displayed in the DUI View. The Taskbar on the Network Status and Options Page may always include the following tasks:

New Connection—Clicking this button may launch the Get Connected Wizard on top of the Network Status and Options Page.

Castle—Clicking this button may launch the Home Networking Wizard on top of the Network Status and Options Page. This option may not be available if the computer is joined to a domain.

Add a Network Device—Clicking this button may launch the Add a Network Device Wizard on top of the Network Status and Options Page.

Diagnostics—Clicking this button may launch the network diagnostics troubleshooter on top of the Network Status and Options Page.

The pagespace may include several options:

A Network Status and Options—This may be the current view.

Computers and Network Devices—This link may open the Network Explorer in frame.

Network Map—This-link may open the Network Map in frame.

Saved Networks—This link may open the Network Profiles Folder.

Connections—This link may open the Network Connections Folder in frame.

The largest component of a Shell folder is typically the Listview View. As is the case with the Network Map, this view may be replaced with a DUI view in the Network Status and Options Page. A DUI View may be used in the Network Status and Options Page in order to display the Network Mini-Map.

The Network Status and Options Page may be composed of three sections:

Network Mini-Map—The Network Status and Options Page may simply host the Network Mini-Map provided by the NCSI code.

Network Profiles Status—This section may be located immediately below the Network Mini-Map and may include the same information as the flyout for the networking tray icon. Specifically, this information may be a list of all the currently connected network profiles and the list of connection s currently connecting the user session to each connected network profile. Clicking on a network profile may open the property pages for the selected network profile on top of the Network Status and Options Page.

Relevant Tasks—Another benefit of using a DUI View is that tasks may be shown inline. Based upon the state reported by the NCSI code and communicated through the Network Mini-Map, a set of high-level, state-specific task may be enumerated immediately below the list of connected network profiles. Clicking on one of these tasks may launch the logic and experience associated with the selected task.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. On a device, a computer-readable storage medium having computer-executable instructions thereon for automatically classifying networks to which the device is enabled to connect, comprising: a store, a network location awareness service (NLA), and a network profile manager in communication with the store and the NLA, wherein:

the store includes: one or more network profiles and one or more network signatures, wherein each of the one or more network signatures corresponds to a respective network profile and the one or more network profiles and the one or more network signatures are managed by the network profile manager; and the network profile manager comprises a single COM object enabled to:

register with the NLA to receive notifications from the NLA when a status of a network connection to the device changes;

provide a set of notifications to a client, the set of notifications including separate notifications for:

a connection of a network corresponding to an existing network profile, a disconnection of the network corresponding to the existing network profile, an addition of a newly-added network profile, a deletion of the existing network profile, and a change to a property of the existing network profile; and expose a set of application program interfaces (APIs) for managing network profiles, the set of APIs including separate APIs for:

enumerating network profiles corresponding to the networks that are connected to the device;

enumerating network profiles corresponding to networks that are disconnected from the device;

enumerating all network profiles;

enumerating network signatures for a specified network profile;

enumerating network interfaces corresponding to the specified network profile;

providing a connection status corresponding to the specified network profile, the status being one of connected or disconnected;

providing a connection status corresponding to a specified network signature, the status being one of connected or disconnected;

providing an authentication status corresponding to the specified network profile, the status being one of authenticated or not authenticated;

managing a friendly name for the specified network profile, the managing including getting the friendly name and setting the friendly name;

managing an icon for the specified network profile, the managing including getting the icon and setting the icon;

managing a description for the specified network profile, the managing including getting the description and setting the description;

obtaining a date corresponding to a creation date of the specified network profile; and obtaining a date corresponding to a date of a connection, to the device, of a network corresponding to the specified network profile.

2. The computer-readable storage medium of claim 1, wherein the computer-executable instructions thereon further comprise a network profile management user interface, and wherein the set of APIs further includes a set of user interface APIs for use by the network profile management user interface, the set of user interface APIs including separate APIs for:
- changing an association of a given network signature from a first network profile to a second network profile;
- deleting the given network signature;
- creating a new network profile;
- deleting a given existing network profile; and
- merging at least two selected existing network profiles.

3. The computer-readable storage medium of claim 1 wherein a network signature of a particular network connection corresponding to a received notification from the NLA includes a network identification of the particular network connection, a link identification and a hop identification.

4. The computer-readable storage medium of claim 1, wherein the one or more network profiles each include a network identification, a name, a description, an icon ID, bits indicating managed or unmanaged and authenticated or unauthenticated, and a local time and date that the one or more network profiles was created.

5. The computer-readable storage medium of claim 1, wherein the one or more network signatures each include a network signature identification, a description, bits indicating managed or unmanaged and authenticated or unauthenticated, and the ID of an owning network profile.

6. The computer-readable storage medium of claim 1, wherein the computer-executable instructions for the network profile manager further comprise computer-executable instructions for deleting a network profile from the store that is not managed or corresponds to a specific network that is unconnected to the device.

7. The computer-readable storage medium of claim 1, wherein the computer-executable instructions for the network profile manager further comprise computer-executable instructions for:
- receiving a notification of a specific status change of a specific network connection from the NLA;
- updating a signature status of a first stored network signature corresponding to a first network profile in the store when a received network signature corresponding to the specific network connection entirely matches the first stored network signature;
- merging the received network signature with a second stored network signature corresponding to the first network profile in the store when the received network signature matches a portion of the second stored network signature; and
- creating a new network profile corresponding to the received network signature with a specified name and returning data that allows use of the created new network profile with the specified name when the received network signature does not match a portion of any stored network signature in the store.

8. The computer-readable storage medium of claim 7, wherein the computer-executable instructions for merging the received network signature with the second stored network signature corresponding to the first network profile in the store when the received network signature matches the portion of the second stored network signature further comprises computer-executable instructions for:
- associating the received network signature with the first network profile when the received network signature is managed and the network identification and an authentication status of the received network signature matches a network identification and an authentication status of the second stored network signature; and
- associating the received network signature with the first network profile when the received network signature is unmanaged and the network identification and the link identification of the received network signature matches the network identification and a link identification of the second stored network signature.

9. The computer-readable storage medium of claim 7, wherein the computer-executable instructions for the network profile manager further comprises computer-executable instructions for:
- returning a unique identifier of a specified network signature;
- returning an identifier of a network that contains the specified network signature; and
- returning a description for the specified network signature.

10. The computer-readable storage medium of claim 7, wherein the computer-executable instructions for the network profile manager further comprises computer-executable instructions for returning a type of network signature wherein the type comprises at least one of managed, unmanaged, authenticated or unauthenticated.

11. The computer-readable storage medium of claim 7, wherein the computer-executable instructions for the network profile manager further comprises computer-executable instructions for returning a list of interfaces of a specified network signature.

12. The computer-readable storage medium of claim 7, wherein the computer-executable instructions for the network profile manager further comprises computer-executable instructions for moving a specified networking signature from a network profile to which the specified network signature corresponds to another network profile.

\* \* \* \* \*

UNITED STATES PATENT AND TRADEMARK OFFICE
CERTIFICATE OF CORRECTION

PATENT NO.     : 7,590,762 B2                                         Page 1 of 1
APPLICATION NO. : 11/296790
DATED          : September 15, 2009
INVENTOR(S)    : Cunningham et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 838 days.

Signed and Sealed this

Twenty-first Day of September, 2010

David J. Kappos
*Director of the United States Patent and Trademark Office*